United States Patent Office

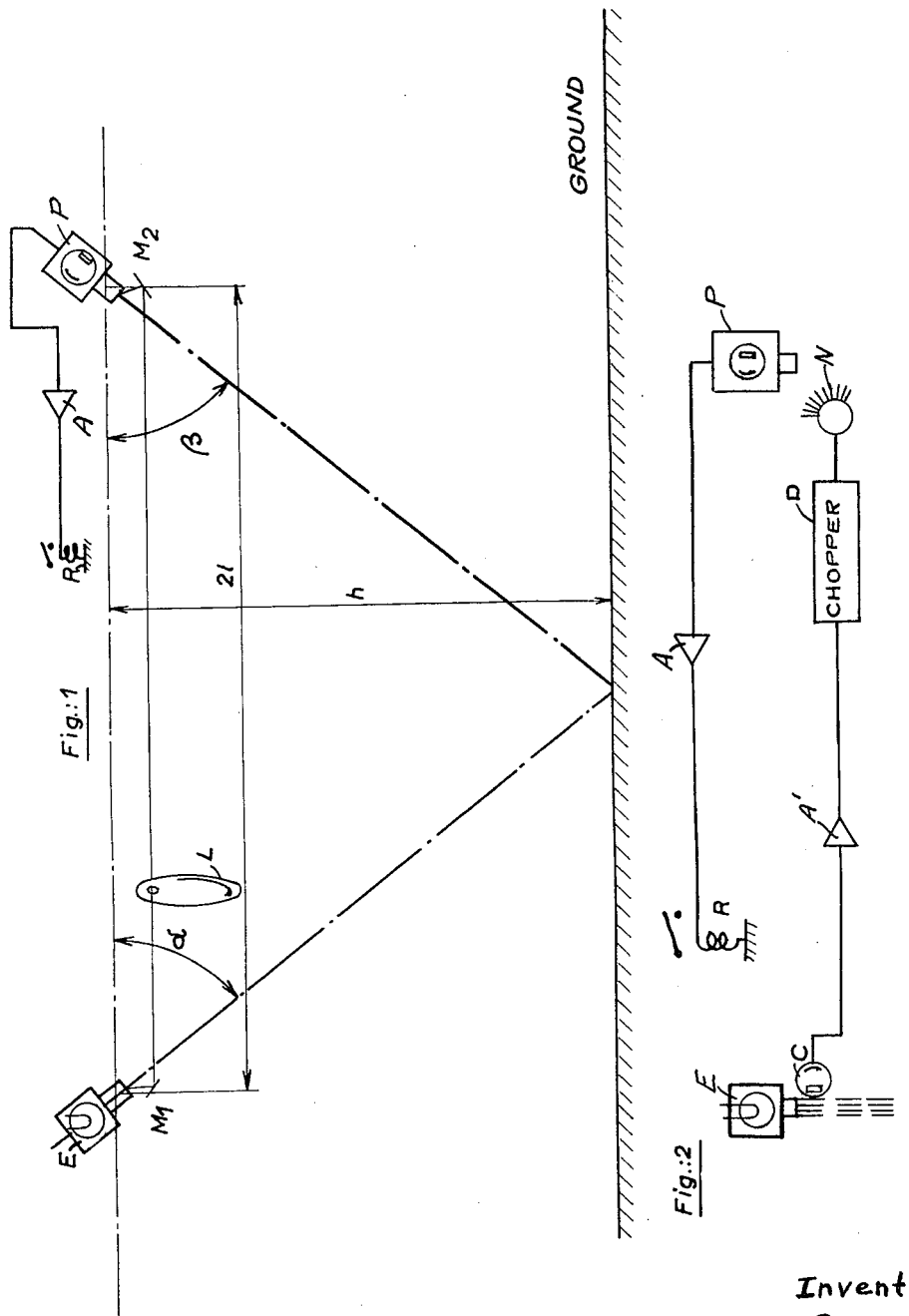

3,217,592
Patented Nov. 16, 1965

3,217,592
CHECKING DEVICE FOR OPTICAL ALTIMETERS AND SIMILAR DEVICES
Adolf Braun, Dammarie-les-Lys, and Jean Charles Prade, Melun, France, assignors to Societe Nationale d'Etude et de Construction de Moteurs d'Aviation
Filed July 17, 1962, Ser. No. 210,481
Claims priority, application France, July 20, 1961, 868,507
4 Claims. (Cl. 88—14)

This invention relates to optical altimeters and similar devices, and in particular to the checking of such devices and checking devices therefor.

Optical altimeters are known which are designed to measure relatively small heights which may range, for example, between some ten centimetres and a few tens of metres. These altimeters essentially comprise (as shown in FIGURE 1 of the accompanying drawings) a modulated-light transmitter E and a receiver P embodying a photoelectric cell. The transmitter and receiver are suitably arranged on board an aircraft at as large a distance $2l$ from one another as possible and are oriented in such manner that their optical axes intersect. The distance $h$ of the point of intersection of the axes is determined trigonometrically from a knowledge of the distance $2l$ and the angles $\alpha$ and $\beta$.

When the aircraft is exactly at the height $h$ above the ground, the photoelectrical receiver P detects the spot of light formed on the ground by the modulated flux issuing from the transmitter E. A suitable signal generated by the receiver and amplified by an amplifier A tuned to the frequency of modulation of the light trips an indicating relay R controlling, for example, a light signal or other signalling device.

Optical altimeters of this nature are known. An improved model no longer limited to detecting a single height $h$, but permitting measurement of the instantaneous altitude of the aircraft whatever it may be, has been described in French Patent No. 1,271,635 granted on August 7, 1961 for "Optical-Signal Altimeter."

The object of the present invention is to check, before actually putting the altimeter into use that it is still in proper working order.

According to the invention, a sampling of the emitted light is effected and this is transmitted periodically, preferably during intervals of time which are brief with respect to the period in question, to energise the photoelectric receiver, thus causing a periodic response to the indicating relay which denotes satisfactory functioning of the altimeter installation.

In one embodiment of the invention, the sampling of light is effected by means of an auxiliary photoelectric cell and the pulse generated by the latter is chopped into signals of short duration separated by a relatively long interval of time, these signals being applied to a neon lamp or the like located in front of the cell of the receiver.

According to a modification, the sampling and the transmission of the modulated light are effected by a set of two plane mirrors respectively fixed to the transmitter and the receiver, the light path being interrupted by a suitable shutter device allowing the light to pass only periodically for relatively short intervals of time. In comparison with the foregoing embodiment, this modified construction has the additional advantage of checking the correct geometrical arrangement of the transmitter and the receiver.

In fact, in the event of accidental disarrangement of the angles $\alpha$ and $\beta$, or of drift of the light beams out of the common plane in which they should lie in order that the optical axes may intersect in the required manner (accidental lateral drift of the transmitter or the receiver), the checking device does not react, thus alerting the operator.

The description which follows with reference to the accompanying drawings, which are given solely by way of non-limitative example, will make it clearly understood how the invention can be carried into effect. In the drawings:

FIGURE 1 is a synoptic diagram of an optical altimeter comprising a checking device in accordance with the invention, and FIGURE 2 shows a modified constructional form of the checking device.

In the embodiment shown in FIGURE 1, a small mirror $M_1$ fixed in front of the transmitter E reflects a fraction of the light transmitted by the latter towards a second similar mirror $M_2$ fixed in front of the photoelectric receiver P. The latter mirror is arranged so that the modulated light reflected by the mirror $M_1$ energises the photoelectric cell of the receiver without, however, intersecting the optical receiving axis.

A suitable mechanical device such as a rotary ported disc L periodically covers the mirror $M_1$ during intervals of time which are long in relation to the period of operation, for example 990 milliseconds per second. Thus, for 10 milliseconds the receiver will be energised by a ray coming from the transmitter if all the parts are functioning well and if the transmitter and the receiver are suitably oriented; the output relay R will operate, causing a winking or flickering of the signal, which is a sign of saitsfactory functioning of the assembly.

Of course, when the given altitude $h$ is reached; the receiver P is energised in a continuous manner at the frequency of modulation, and the winking signal is replaced by a prolonged lighting up.

The adjustment of the orientation of the two mirrors $M_1$ and $M_2$, however, is a rather difficult operation.

If, in practice, accidental disarrangement of the optical axes of the transmitter and the receiver is not feared, it will be sufficient to resort to the modified constructional form shown in FIGURE 2, in which the mirrors $M_1$ and $M_2$ are replaced respectively by an auxiliary photoelectric cell C and a neon lamp N.

The cell C is arranged to pick up a fraction of the modulated light signal emitted by the transmitter E. The alternating electrical signal which results is amplified by an amplifier A' and then chopped at D into 10 millisecond pulses at a frequency of recurrence of 1 second, using again the foregoing numerical example.

The chopped signal is supplied to the neon lamp N fixed close to the receiver P and arranged in such manner that the resultant flashing thereof energises the photoelectric receiving cell, although the lamp is offset from the optical axis of the receiver.

Throughout the duration of a flash, that is 10 milliseconds, modulated at the transmitter frequency, the photoelectric receiver P is energised and this is manifested by pulling-in of the output relay R at the frequency of recurrence of the signal, that is 1 second. The light signal thus winks or flickers as in the preceding example.

Although reference has always been made in the foregoing description to the operation of the device as an altimeter, it is quite obvious that this device could be used for detecting the distance from a moving body to any obstacle.

There has been illustrated and described what is considered to be preferred embodiments of the invention. It will be understood, however, that various modifications may be made without departing from the scope of the following claims.

What we claim is:
1. In an electro-optical telemetric apparatus of the kind comprising a light-emitting source and a photo-electric cell spaced from each other and mutually oriented to form the base for an optical triangulation measurement, and a signalling system under the control of said photoelecric cell including an operativeness check device, said device comprising in combination, first auxiliary means optically coupled to said source for collecting a fraction of the light emitted thereby for generating and transmitting a signal corresponding to said fraction, second auxiliary means coupled to said cell for receiving said signal and for projecting a beam of light into said cell to energize the same in accordance with said signal, and chopping means interposed in the light-signal path between said source and said cell including said first and second auxiliary means for converting said beam of light into a succession of light pulses whereby said cell is intermittently energized to provide an indication of operativeness and alignment of said source and said photo-electric cell.

2. Apparatus as claimed in claim 1, wherein the chopping means converts the beam of light into periodically recurring light pulses, the duration of a pulse being relatively short compared with the time interval between successive pulses.

3. Apparatus as claimed in claim 1, wherein said first auxiliary means comprises a first optical reflector positioned in the field of the light-emitting source, said second auxiliary means comprises a second optical reflector positioned in the field of the photo-electric cell, said optical reflectors being mutually positioned so that the light reflected by the first-mentioned reflector is incident on the second reflector, and said chopping means comprises a recurrently acting light obturator positioned in the optical path which extends between said source and said cell and includes said reflectors.

4. In an electro-optical telemetric apparatus of the kind comprising a light-emitting source and a first photo-electric cell spaced from each other and mutually oriented to form the base for an optical triangulation measurement, and a signalling system under the control of said photoelectric cell including an operativeness check device, said device comprising in combination, a second photo-electric cell positioned in the field of the light-emitting source for collecting a fraction of the light emitted thereby and for generating and transmitting an electric signal corresponding to said fraction, a glow lamp positioned in the field of said first photo-electric cell and adapted to be actuated by said signal, the actuation of said glow lamp causing it to project a beam of light into said first photoelectric cell to energize same in accordance with said signal and an electronic chopper having its input connected with said second photo-electric cell and its output connected with said glow lamp in order to convert said signal into a succession of pulse signals whereby said first photoelectric cell is intermittently energized to provide an indication of operativeness and alignment of said source and said first photo-electric cell.

References Cited by the Examiner

UNITED STATES PATENTS

| | | | |
|---|---|---|---|
| 2,261,272 | 11/1941 | Newhouse | 88—1 |
| 2,376,836 | 5/1945 | Tunnecliffe | 88—1 |
| 2,632,358 | 3/1953 | Ehat | 88—14 |
| 2,956,472 | 10/1960 | Hildebrand | 88—1 |
| 3,006,234 | 10/1961 | Herriott | 88—1 |
| 3,157,792 | 11/1964 | Low et al. | 250—213 |

FOREIGN PATENTS 1,271,635  8/1961  France.

JEWELL H. PEDERSEN, *Primary Examiner.*